United States Patent
Manoharan et al.

(10) Patent No.: US 12,260,203 B2
(45) Date of Patent: *Mar. 25, 2025

(54) CONTAINER ORCHESTRATION FRAMEWORK

(71) Applicant: PayPal, Inc., San Jose, CA (US)

(72) Inventors: Srinivasan Manoharan, San Jose, CA (US); Vinesh Chirakkil, San Jose, CA (US); Yuehao Wu, Cupertino, CA (US); Junhua Zhao, Sunnyvale, CA (US); Xiaoying Han, San Jose, CA (US); Chun Kiat Ho, Singapore (SG); Premila Viswanathan, Dublin, CA (US); Lin Song, Singapore (SG)

(73) Assignee: PAYPAL, INC., San Jose, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/891,876

(22) Filed: Aug. 19, 2022

(65) Prior Publication Data
US 2023/0126597 A1  Apr. 27, 2023

Related U.S. Application Data

(63) Continuation of application No. 16/519,734, filed on Jul. 23, 2019, now Pat. No. 11,422,785.

(51) Int. Cl.
*G06F 8/61* (2018.01)
*G06F 8/41* (2018.01)
*G06F 9/455* (2018.01)

(52) U.S. Cl.
CPC .................. *G06F 8/61* (2013.01); *G06F 8/41* (2013.01); *G06F 9/45558* (2013.01); *G06F 2009/45562* (2013.01); *G06F 2009/45591* (2013.01)

(58) Field of Classification Search
CPC . G06F 8/61; G06F 8/41; G06F 9/4481; G06F 9/45558
See application file for complete search history.

(56) References Cited

U.S. PATENT DOCUMENTS 10,326,668 B2 * 6/2019 Jones ................. G06F 3/04842
11,422,785 B2 * 8/2022 Manoharan ............... G06F 8/41
(Continued)

OTHER PUBLICATIONS

International Appl. No. PCT/US2020/043315, International Search Report and Written Opinion mailed on Sep. 14, 2020, 7 pages.

*Primary Examiner* — Lewis A Bullock, Jr.
*Assistant Examiner* — Theodore E Hebert
(74) *Attorney, Agent, or Firm* — Haynes and Boone, LLP

(57) ABSTRACT

Methods and systems are presented for providing a container orchestration framework for facilitating development and deployment of software applications across different operating environments within an enterprise system. Upon receiving a service request for processing a set of data is received, the container orchestration framework determines one or more machines that store the set of data. Instead of processing the set of data remotely, the container orchestration framework deploys a container that encapsulates an application on the one or more machines. Each application instance running on the one or more machines are executed to process a corresponding subset of data stored on the machine locally. The container orchestration framework obtains the output data from executing the applications on each of the one or more machines, and present the output data as a response to the service request.

20 Claims, 7 Drawing Sheets

(56) References Cited

U.S. PATENT DOCUMENTS

| | | | | |
|---|---|---|---|---|
| 2013/0198354 A1* | 8/2013 | Jones | H04L 41/5045 |
| | | | 709/223 |
| 2013/0298183 A1* | 11/2013 | McGrath | H04L 63/10 |
| | | | 718/1 |
| 2014/0075433 A1* | 3/2014 | Kotton | G06F 9/5083 |
| | | | 718/1 |
| 2015/0263904 A1* | 9/2015 | Jones | G06F 3/0482 |
| | | | 715/739 |
| 2017/0046146 A1* | 2/2017 | Jamjoom | G06F 8/62 |
| 2018/0004539 A1* | 1/2018 | Liguori | G06F 9/45558 |
| 2018/0046503 A1* | 2/2018 | Feng | G06F 9/5077 |
| 2018/0336123 A1* | 11/2018 | Benes | G06F 11/3692 |
| 2019/0042319 A1* | 2/2019 | Sood | G06F 21/74 |
| 2019/0102280 A1* | 4/2019 | Caldato | G06F 9/5072 |
| 2019/0116110 A1* | 4/2019 | Raney | G06F 8/60 |
| 2019/0213346 A1* | 7/2019 | Friedman | G06F 21/6218 |
| 2019/0272179 A1* | 9/2019 | McMullen | G06F 9/445 |
| 2019/0321725 A1* | 10/2019 | Zimring | G06F 9/45558 |
| 2020/0014609 A1* | 1/2020 | Hockett | H04L 67/1001 |

* cited by examiner

CONTAINER ORCHESTRATION FRAMEWORK

CROSS-REFERENCE TO RELATED APPLICATIONS

This application is a continuation of U.S. patent application Ser. No. 16/519,734, filed Jul. 23, 2019, which is incorporated herein by reference in its entirety.

BACKGROUND

The present specification generally relates to computer software development and deployment, and more specifically, to providing a container orchestration framework for developing and deploying software products according to various embodiments of the disclosure.

RELATED ART

Modern enterprises today depend on computer software products (e.g., software applications) to run their operations (e.g., providing services to customers, performing internal administrative tasks, etc.). Developing, deploying, and/or maintaining these software products in an enterprise system can be challenging, especially when the enterprise system includes different computer operating environments that can be changed and/or evolve over time. For example, a software application that is developed for a particular operating environment (e.g., a particular operating system, a particular computer hardware architecture, etc.) may not work in another operating environment, which may limit where (e.g., on which machine) the software application can be deployed. In some instances, even a different version of the same operating environment may not be compatible with the software application. Furthermore, software applications that are developed for different operating environments may not run on the same machine. These limitations pose incredible challenges to enterprises in maintaining the software applications as the operating environments of the software applications can be constantly changing/evolving, and requirements for different software applications to work together may arise.

Thus, there is a need for providing a framework for developing and deploying software applications in a scalable manner.

Figure 1:
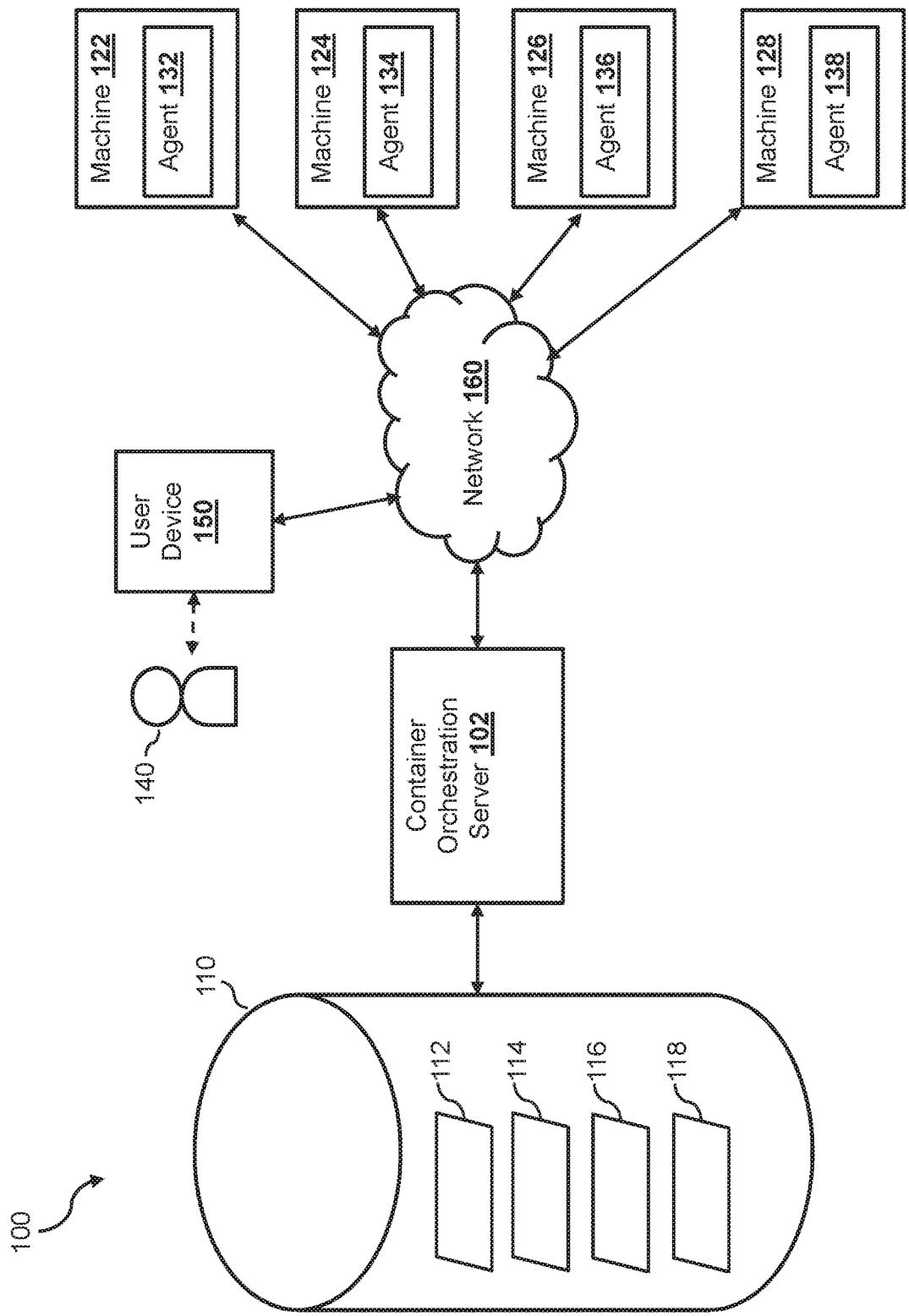
FIG. 1 is a block diagram illustrating a container orchestration framework according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a container orchestration framework for facilitating development and deployment of software applications across different operating environments within an enterprise system. In some embodiments, the container orchestration framework enables each software application to be encapsulated within a separate container. A container may encapsulate a corresponding software application (e.g., the computer programming code associated with the software application), a software development kit associated with the application (which may include a compiler, any dependencies associated with the application such as one or more software libraries utilized by the software application, and a runtime environment in which the software application may run), and any configuration parameters for running the software application. Unlike a virtual machine, a container does not include a kernel or an operating system. Instead, once deployed on a machine, the application corresponding to the container runs on a native operating system hosted by the machine. The containers may be stored in a container database ready to be deployed.

Since the container is not tied to any particular operating environment, the container may be deployed on any machine (and/or different types of machines) as needed on an ad-hoc basis. For example, the container orchestration framework may deploy a container on a first machine having a first operating environment (e.g., Windows® Server 2019 operating system, a 64-bit processor, etc.), and subsequently deploy the same container on a second machine having a second operating environment (e.g., Mac® OS X Server operating system, a 32-bit processor, etc.), without requiring any modification to the software application or the container. Furthermore, since each container includes the dependencies and the runtime environment needed by the encapsulated application to run on any machine, the container orchestration framework may deploy different applications that require different dependencies and/or runtime environments on the same machine. Thus, the mechanism of a container provides increased efficiency and flexibility to enterprise systems by enabling software applications to be deployed on and/or removed from any machine on an as-needed basis.

To deploy a container on a machine, the container orchestration framework of some embodiments may first determine an operating environment associated with the machine (e.g., what type of operating system is running or hosted by the machine, what type of computer hardware architecture does the machine have, etc.). The container orchestration framework may then deploy the software application encapsulated within the container on the machine based on the operating environment associated with the machine. For example, the container orchestration framework may compile the source code associated with the software application and the dependencies into executable code (e.g., an executable file) in a format corresponding to the operating environment of the machine (e.g., an executable compatible with Windows Server® operating system running on a 64-bit processor, etc.), store the executable file on the machine, and install a version of the runtime environment (that is included in the container) corresponding to the operating environment on the machine.

Once the container is deployed on the machine, the application (e.g., the executable file) can be executed to perform various functions. In some embodiments, the application may be used to receive input data and generate output data. For example, the application may be a web server configured to process service requests (e.g., payment transaction requests) and provide authorization data and/or transaction data based on the service requests. In another example, the application may be a machine learning modeling application configured to evaluate risks of service requests. These applications may be deployed in an online environment (e.g., deployed on one or more machines connected to an external network such as the Internet) for processing and evaluating service requests submitted by user devices over the external network. However, in some instances, the applications may also be deployed in an offline environment (e.g., deployed on one or more machines that are not accessible by the public or through a wireless communication network) for various purposes. For example, the applications may be used internally to run simulations based on previously recorded transaction data.

It has been contemplated that the data (e.g., the recorded transaction data) needed for the application to perform the function(s) (e.g., to run the simulations, etc.) may be large (e.g., thousands, or millions or records, etc.), and that the data may be stored across multiple machines by a distributed data storage system (e.g., Apache® Hadoop®, etc.). Thus, the performance (e.g., speed) of performing the function(s) may largely depend on the speed for the application to access the data needed for performing the function(s). If the application for performing the function(s) is deployed on a machine remote from the machines that store the data, the efficiency of performing the function(s) by the application can be drastically reduced, as the data must first be transmitted from the machines on which the data is stored to the machine on which the application is deployed before the application can perform the function(s).

Thus, according to various embodiments of the disclosure, the container orchestration framework may be configured to dynamically deploy a container on one or more machine(s) for processing a service request based on a location of the data required by the service request. In some embodiments, the container orchestration framework may determine one or more machines on which the data required by the service request is stored, and may deploy the container (that encapsulates the application for processing the service request) on the one or more machines such that the data needed for performing the function(s) is local to the application. The container orchestration framework may then remove the container from the one or more machines after the service request is processed, and may deploy the container on other machines based on a subsequent request. This way, the container orchestration framework ensures that the data needed by the application is always local to the application for performing the function(s) associated with the service requests. Having the data local to the application can substantially improve the performance of processing the service requests as the time for transmitting the data between different machines can be reduced or eliminated.

In some embodiments, the container orchestration framework may provide a user interface (e.g., a command line interface, a graphical user interface, etc.) for receiving a service request to perform one or more function(s). The service request may indicate the data (or the type of data) required by the service request. For example, the service request may be for running a simulation of processing the transaction requests recorded over the past month. Upon receiving the request via the user interface, the container orchestration framework may first determine one or more machines that store the data (e.g., the transaction records of the past month, etc.) that is needed for performing the function(s). For example, the container orchestration framework may query a distributed data storage system for machine locations (e.g., network addresses, etc.) of the machines that store the data needed to perform the function(s).

In some embodiments, the container orchestration framework may also determine the container(s) that encapsulate one or more applications associated with the service request, and may deploy the container(s) on the one or more machines that store the data. As discussed herein, to deploy the container(s) on the one or more machines, the container orchestration framework may first determine the operating environment(s) of the one or more machines, and may deploy the container(s) (e.g., compile the code of the application, select a version of the runtime environment, etc.) on the one or more machines based on the operating environment(s) of the one or more machines. The container orchestration framework may execute the application to perform the function(s) on the one or more machines based on the data identified in the service request. Since the data needed by the application to perform the function(s) is local to the application (as the application is deployed on the machine that is local to the data), the performance of processing the service request (e.g., performing the function(s)) can be substantially improved.

When it is determined that the data needed to process the service request is distributed across multiple machines (e.g., each of the machines may store a subset of the data needed to perform the function(s)), the container orchestration framework may deploy the container on each of the multiple machines, and execute the application instances deployed on the machines separately to process the service request based on the corresponding subsets of data stored on the machines. Since the container is agnostic to operating environments (e.g., not tied to any operating environment), the container orchestration framework may deploy the container on the machines even when the machines are associated with different operating environments (e.g., hosting different operating systems, different versions of operating systems, etc.) without requiring any modifications to the application and/or the container. Furthermore, having the container deployed on multiple machines enables the function(s) to be performed on the multiple machines concurrently, which further improves the performance of performing the function(s). The container orchestration framework may then obtain the results (e.g., output data) produced by the different application instances deployed on the machines, and perform further analysis based on the results and/or provide the results to the user via the user interface.

In some embodiments, the container orchestration framework may determine that multiple applications are required to perform the function(s). For example, the container orchestration framework may determine that in order to process the service request, a first sub-task may be performed by a first application based on first input data, and a second sub-task may be performed by a second application based on output data produced by the first application (and possibly additional input data such as second input data). Thus, the container orchestration framework may deploy a first container corresponding to the first application and a second container corresponding to the second application on the multiple machines that store the input data. Since the containers are agnostic to the operating environment and include all of the dependencies, runtime environments, and configuration parameters to execute the applications, the containers may be deployed on the multiple machines without requiring any modification to the applications and/or the containers. Furthermore, the first and second containers can be deployed on the same machines even though the first and second applications may require different dependencies and/or different runtime environments. The container orchestration framework may then execute the first application on a machine based on the input data stored locally on the machine to produce output data, and execute the second application on the machine based on the output data produced by the first application. Since the applications are executed to consume data stored locally on the machine on which the applications are deployed, the performance (e.g., the speed) of performing the function(s) can be substantially improved.

In some embodiments, the container orchestration framework may determine that the first input data required by the first application to perform the first sub-task and the second input data required by the second application to perform the second sub-task may be stored on different machines (e.g., stored on a first machine and a second machine, respectively). The container orchestration framework may then deploy the first container on the first machine, and may deploy the second container on the second machine. The container orchestration framework may execute the first application deployed on the first machine based on the first input data stored on the first machine to obtain output data. The container orchestration framework may then transmit the output data to the second machine, and may execute the second application deployed on the second machine based on the output data and the second input data stored on the second machine. After processing the service request, the container orchestration framework may remove the containers and all related files from the machines to return the machines to the same state prior to deploying of the containers.

FIG. 1 illustrates an enterprise system 100 within which the container orchestration framework may be implemented according to one embodiment of the disclosure. The enterprise system 100 includes a container orchestration server 102, a container database 110 that stores one or more containers (e.g., containers 112-118), a user device 150, and one or more machines 122-128. The container orchestration server 102, the user device 150, and the one or more machines 122-128 may be communicatively coupled with each other via a network 160. The network 160 represents an internal network associated with an enterprise. The network 160, in one embodiment, may be implemented as a single network or a combination of multiple networks. For example, the network 160 may include one or more intranets such as one or more local area networks associated with the enterprise system 100. The network 160 may be implemented using one or more landline networks, wireless networks, and/or other appropriate types of communication networks. In some embodiments, the network 160 enables the devices within the enterprise system 100 to communicate with each other. Furthermore, at least some of the devices (e.g., the user device 150, one or more of the machines 112-118) may also be communicatively coupled with an external network (e.g., the Internet) such that the at least some of the devices may be accessed by a device external to the enterprise system 100.

The user device 150, in one embodiment, may be utilized by a user 140 to interact with the container orchestration server 102 and/or the machines 122-128 over the network 160. For example, the user 140 may use the user device 150 to submit a service request for using one or more applications corresponding to one or more of the containers 112-118 to the container orchestration server 102 via a user interface provided by the container orchestration server 102. In a non-limiting example, the user 140 may submit a request to the container orchestration server 102 for using a web server to run a simulation of performing transactions based on the transactions conducted with the enterprise system 100 during a particular period of time. The user 140 may also use the user device 150 to directly use services provided by the one or more machines 122-128. For example, at least some of the machines 122-128 may include applications for conducting internal tasks (e.g., accounting tasks, administration tasks, etc.) associated with the enterprise, and the user 140 may use the user device 150 to conduct the internal tasks by interacting with the one or more machines 122-128. The user device 150, in various embodiments, may be implemented using any appropriate combination of hardware and/or software configured for wired and/or wireless communication over the network 160. In various implementations, the user device 150 may include at least one of a wireless cellular phone, wearable computing device, PC, laptop, etc.

The user device 150, in one embodiment, includes a user interface (UI) application, which may be utilized by the user 140 to interact (e.g., submit service requests, etc.) with the container orchestration server 102 and/or the one or more machines 122-128 over the network 160. In one implementation, the user interface application of the user device 150 may be configured to interface and communicate with the container orchestration server 102 via the network 160. The user interface application may be implemented, in part, as a web browser, a proprietary client-side application, or a command line prompt to submit service requests over the network 160 to the container orchestration server 102 and present results obtained from the service requests.

Even though only one user device 110 is shown in FIG. 1, it has been contemplated that one or more user devices (each similar to user device 110) may be communicatively coupled with the container orchestration server 102 and the machines 122-128 via the network 160 within the enterprise system 100.

Each of the machines 122-128 may be maintained by the enterprise associated with the enterprise system 100 for performing various tasks for the enterprise system 100. Each machine, in various embodiments, may be implemented using any appropriate combination of hardware and/or software configured for performing the corresponding tasks for the enterprise system 100 and performing wired and/or wireless communication over the network 160 with other machines, the user device 150, and the container orchestration server 102. In various implementations, each machine may include at least one of a computer server, a PC, a laptop, a tablet, etc. As discussed herein, at least one of the machines 122-128 may be communicatively coupled with an external network (external to the enterprise system 100 such as the Internet) for processing transaction requests submitted from external devices (e.g., a mobile device of a user of the enterprise). For example, at least one of the machines 122-128 may include a web server configured to process web requests (e.g., HTTP requests) submitted from external devices. The web server may provide a web interface (e.g., in the form of webpages) for the external devices to interact with the enterprise system 100. Via the web interface, users of the external device may submit various requests such as transaction requests (e.g., a login request for accessing a user account with the enterprise, a payment request for transferring a payment to another account, etc.) to the web server.

In some embodiments, the web server may use other machines (e.g., another one of the machines 122-128) to perform a specific task associated with the transaction requests (e.g., evaluating a risk associated with the transaction request, processing of a payment transaction, accessing data associated with a user account, etc.). Thus, some of the other machines 122-128, while not directly communicatively coupled to the external network, may support the web server by performing tasks for the web server. For example, at least one of the machines 122-128 may include a data storage system (e.g., a database management system, a distributed data storage system, etc.) for storing data associated with the user accounts with the enterprise, and at least one of the machines 122-128 may include a data storage system (e.g., a database management system, a distributed data storage system, etc.) for storing transaction data associated with previous transactions conducted by the enterprise system 100 for external users. Thus, one or more of the machines 122-128 may either store data on the machine or in a database that is locally accessible by the machine.

As shown in the FIG. 1, each of the machines 122-128 may include a framework agent (e.g., framework agents 132-138). In some embodiments, the framework agents 132-138 may cooperate with the container orchestration server 102 to implement the container orchestration framework as discussed herein. In some embodiments, the container orchestration server 102 may be implemented using any appropriate combination of hardware and/or software configured for performing functions associated with the container orchestration framework and performing wired and/or wireless communication over the network 160 with the user device 150 and the machines 122-128. In various implementations, the container orchestration server 102 may include at least one of a computer server, a PC, a laptop, a tablet, etc.

Figure 2:
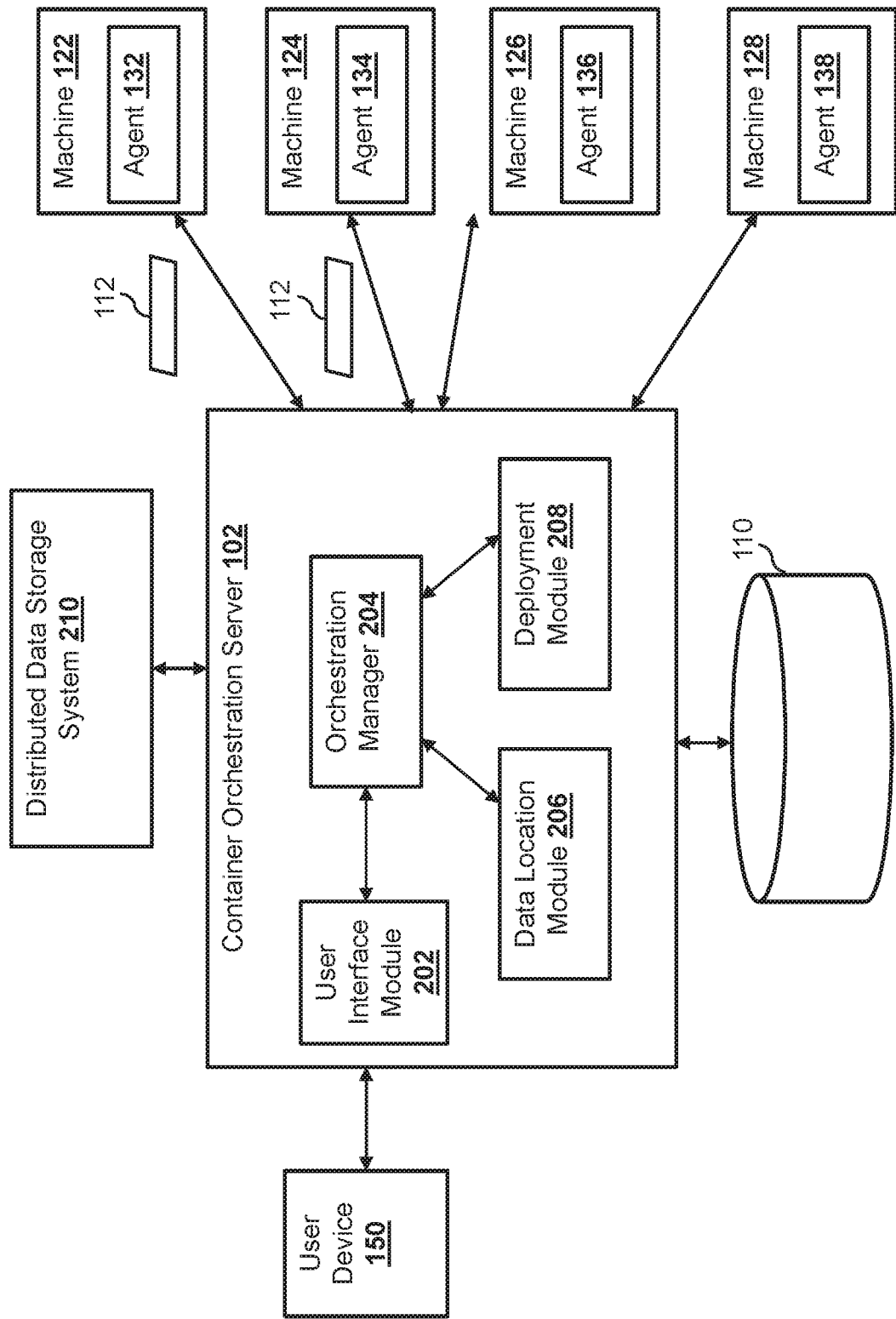
FIG. 2 is a block diagram illustrating deploying of containers by the container orchestration framework according to an embodiment of the present disclosure.

FIG. 2 illustrates a block diagram of the container orchestration server 102 according to an embodiment of the disclosure. The container orchestration server 102 includes a user interface module 202, an orchestration manager 204, a data location module 206, and a deployment module 208. In some embodiments, the container orchestration server 102 may be configured to process service requests submitted by user devices within the enterprise system (e.g., the user device 150). For example, the user interface module 202 may provide a user interface (e.g., a web interface, a graphical interface, a command line prompt interface, etc.) on the user device 150 for receiving service requests. As such, the user 140 may submit a service request to the container orchestration server 102 via the user interface provided by the user interface module 202. The service request may include a request to perform one or more functions based on a dataset. An example service request may include a request for running a simulation of processing transactions that were conducted in a particular period of time (e.g., the past 5 years, etc.). Another example service request may include a request for evaluating a machine learning model by running the machine learning model against transactions conducted in a particular period of time (e.g., the past 5 years, etc.). The examples illustrated herein are not limiting, and the service request processed by the container orchestration server 102 may include other types of requests for performing other types of functionalities.

As illustrated by the examples illustrated above, the service request received from the user device 150 may include using one or more applications to process data from a dataset. The dataset may be large in volume (e.g., millions of transaction records conducted during the past 5 years, etc.), and may be stored in one or more of the machines 122-128. If the dataset is sufficiently large, the data may be distributed across multiple machines, for example, by a distributed data storage system (e.g., the distributed data storage system 210). Thus, when the container orchestration server 102 receives a service request, the orchestration manager 204 may use the data location module 206 to query the distributed data storage system 210 for network location(s) of the machine(s) that store the dataset. The orchestration manager 204 may also identify one or more containers corresponding to application(s) needed to process the service request. The container deployment module 208 may then deploy the one or more containers on the machine(s) that store the dataset based on the network location(s).

Figure 3:
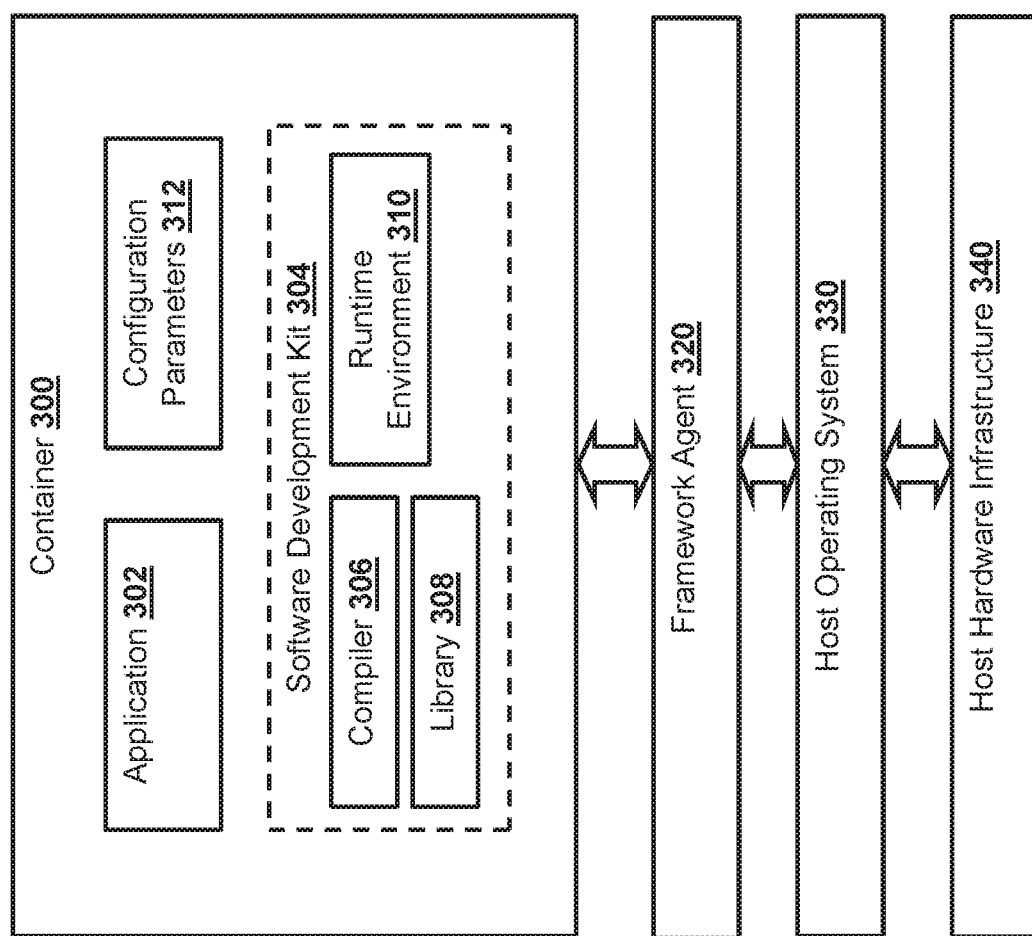
FIG. 3 is a block diagram illustrating an example container according to an embodiment of the present disclosure.

As discussed herein, a container, in some embodiments, is a self-contained package that may encapsulate a software application and all necessary tools and data that the software application depends on and/or requires in order to run on a machine. FIG. 3 illustrates an example container 300 according to one embodiment of the disclosure. The container 300 may include (e.g., encapsulate) a software application 302 (e.g., source code of the application 302), a software development kit 304, and configuration parameters 312 for executing the software application 302 on a machine. The software development kit 304 may include all the necessary tools and dependencies required by the software application 302 to execute on a machine. For example, the software development kit 304 may include a compiler 306, a software library 308, and a runtime environment 310. The compiler 306 may be configured to compile source code of a programming language used by the application 302. For example, if the application 302 was developed using JAVA®, then the compiler 306 included in the container 300 may be a JAVA® compiler. The compiler 306 may be able to compile the source code of the application 302 into an executable that is compatible with one or more operating environments.

When a software developer develops an application, it is usually developed based on a particular software development environment (e.g., JAVA® SE Development Kit Version 11), with certain assumptions. The assumptions may include certain functions and/or modules used by the application (but not implemented by the application) being available at a runtime the application is developed (e.g., a software library), and certain settings (e.g., a particular runtime environment) associated with the machine on which the application is executed. Thus, applications that are developed based on different software development environments may have different assumptions (e.g., expecting a different set of functions and/or modules to be available, a different runtime environment, etc.). As such, in order to ensure that the application 302 may execute on a machine (e.g., a target machine), the software development kit 304 may also include a software library 308 that includes all of the dependencies associated with the application 302 (e.g., functions and/or modules used by the application 302 that is not implemented within the application 302).

The software development kit 304 may also include the runtime environment 310 associated with the application 302. The runtime environment 310 provides the necessary set up, such as how the application 302 accesses variables, a layout of application memory on the target machine, mechanisms for passing parameters between procedures, interfacing with the operating system of the target machine, etc. for executing the application on the target machine. An example runtime environment is the Java Runtime Environment Version 8.

Accordingly, the container 300 includes all of that is necessary for the application 302 to execute on a target machine. To deploy a container on a target machine, the container deployment module 208 may transmit the container to the framework agent of the target machine (e.g., the framework agent 320). The framework agent 320 may determine an operating environment (e.g., a particular operating system such as the host operating system 330, a particular hardware architecture such as the host hardware infrastructure 340) associated with the target machine, and may compile the source code of the application 302 and the library 308 into an executable file in a format that is compatible with the operating environment associated with the target machine. The framework agent 320 may also install, on the target machine, a version of the runtime environment 310 that is compatible with the operating environment associated with the target machine. The framework agent 320 may then execute the executable file (e.g., running the application 302 on the host operating system 330) to perform the function(s) associated with the service request.

After executing the application 302 on the target machine, the framework agent 320 may obtain output data from the application 302 and transmits the output data to the orchestration manager 204. The orchestration manager 204 may perform additional processing or analysis to the output data and/or present the output data to the user device 150 as a response to the service request. The orchestration manger 204 may then instruct the framework agent 320 to remove the container from the target machine, which may include uninstalling the application and the runtime environment, and deleting any data and/or files associated with the container.

Figure 4:
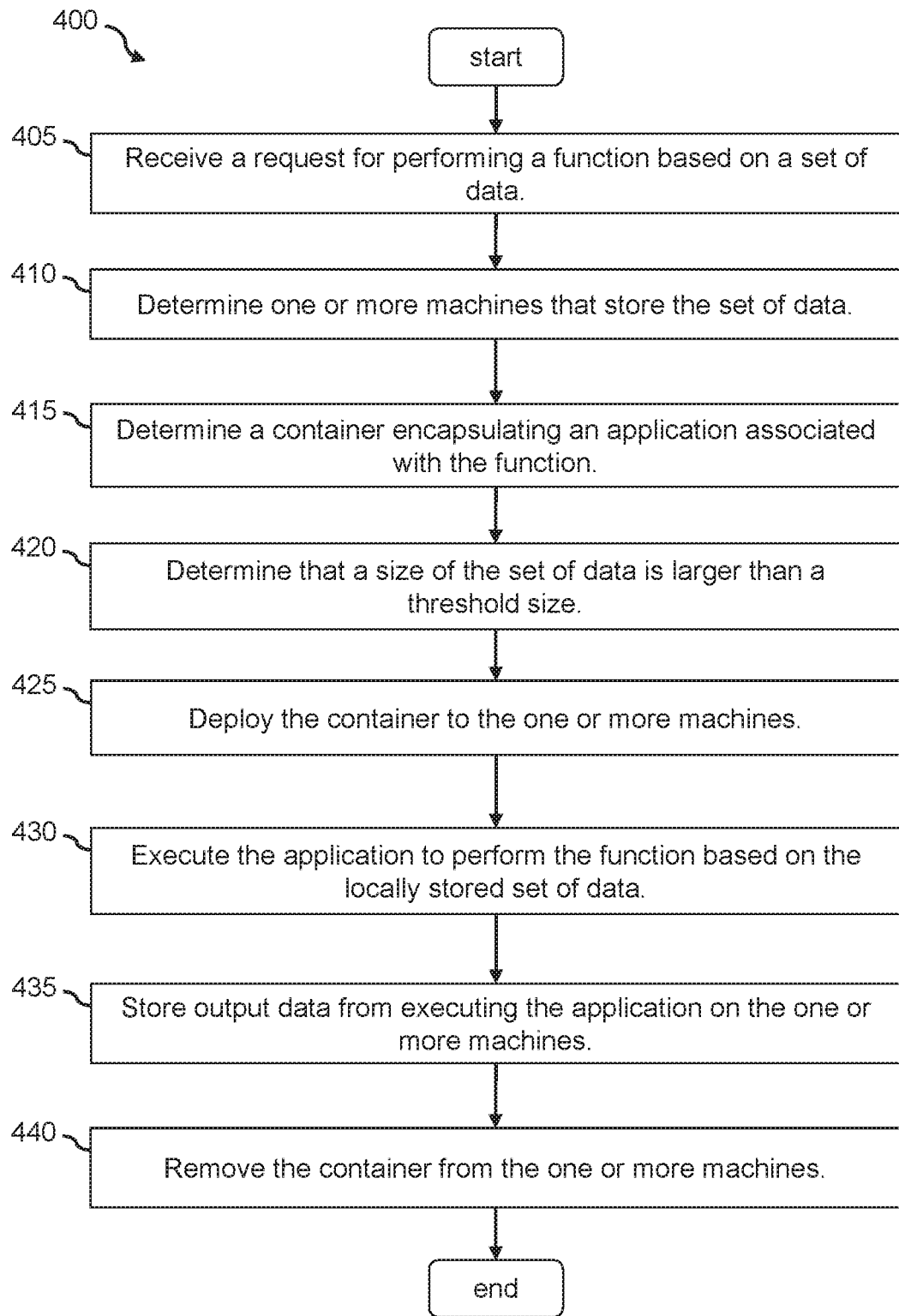
FIG. 4 is a flowchart showing a process dynamically deploying containers on machines for processing service requests according to an embodiment of the present disclosure.

FIG. 4 illustrates a process 400 for processing a service request according to an embodiment of the disclosure. In some embodiments, the process 400 may be performed by the container orchestration server 102 and one or more framework agents (e.g., agents 132-138). The process 400 begins by receiving (at step 405) a service request based on a set of data (e.g., a request for processing the set of data, etc.). For example, the container orchestration server 102 may receive a service request from the user device 150 via a user interface provided by the user interface module 202. In one example, the service request may be a request for running a simulation of processing transactions that were conducted by the enterprise system 100 during a particular period of time (e.g., the past 5 years, etc.). In another example, the service request may be a request for evaluating a machine learning model by running the machine learning model against transactions conducted in a particular period of time (e.g., the past 5 years, etc.).

Upon receiving the service request, the process 400 determines (at step 410) one or more machines that store the set of data. For example, the data location module 206 may determine the one or more machines that store the set of data by querying the distributed data storage system 210. In some embodiments, the distributed data storage system 210 may include mappings of data types and locations of the data corresponding to the data types. As discussed herein, since the set of data required for performing the function based on the service request may be large in volume (e.g., millions of transaction records conducted during the past 5 years, etc.), the set of data may be distributed across two or more of the machines 122-128, for example, by the distributed data storage system 210. In one example, the distributed data storage system 210 may indicate to the container orchestration server 102 that the set of data is stored on the machines 122 and 124, where a first subset of the set of data may be stored on the machine 122 and a second subset of the set of data may be stored on the machine 124.

In addition to determining the one or more machines that store the set of data, the process 400 also determines (at step 415) a container that encapsulates an application associated with the function. In some embodiments, based on the service request, the orchestration manager 204 may determine, from the containers stored in the database 110, one or more containers that encapsulate one or more application(s) for processing the service request. For example, if the service request includes a request for evaluating a machine learning model by running the machine learning model against transactions conducted in a particular period of time, the orchestration manager 204 may determine a container (e.g., the container 112) that encapsulates a machine learning model application for processing the service request.

The process 400 then determines (at step 420) whether a size of the set of data required by the request is larger a threshold size, and deploys (at step 425) the container to the one or more machines if the size of the set of data is larger than the threshold size. The benefits of deploying the container (e.g., the container 112) on the machines that store the set of data for processing (e.g., the machines 122 and 124) may be proportionally related to the size of the set of data. For example, when the size of the set of data is small, the benefits of deploying the container to the machine(s) local to the data may be insignificant, and may not even justify the cost for deploying the container 112 on the machines 122 and 124. Conversely, when the size of the set of data is large, the benefits of deploying the container 112 on the machines may be substantial (e.g., thereby justifying the cost of deploying the container on the machines local to the data). Thus, the deployment module 208 may first determine a size of the set of data required by the service request. The deployment module 208 may deploy the container 112 to the machines 122 and 124 for processing the service request when the size of the set of data is larger than a threshold size (e.g., the threshold size may be predetermined based on empirical data). When the size of the set of data does not exceed the threshold size, the deployment module 208 may deploy the container 112 on a different machine (e.g., a machine that is local to the container, etc.).

In some embodiments, the machines 122 and 124 may have different operating environments. For example, the machine 122 may host a first operating system (e.g., Windows® Server 2019) and a first hardware architecture (e.g., a 64-bit processor) while the machine 124 may host a second operating system (e.g., a Mac® OS X Server operating system) and a second hardware architecture (e.g., a 32-bit processor). Since the container 112 is operating environment agnostic, and includes all of the dependencies and tools for executing the application on different types of machines, the container deployment module 208 may deploy the container 112 on both of the machines 122 and 124 without requiring any modifications to the container 112 or the application encapsulated in the container 112, even though the machines 122 and 124 have different operating environments.

To deploy the container 112 on the machines 122 and 124, the deployment module 208 may transmit the container 112 to the framework agents 132 and 134 installed on the corresponding machines 122 and 124. Each of the framework agents 132 and 134 may determine an operating environment associated with the corresponding machines 122 and 124. For example, the framework agent 132 may determine the operating environment associated with the machine 122. In some embodiments, the framework agent 132 may determine the operating environment associated with the machine 122 by making one or more application programming interface (API) calls to the operating system hosted by (e.g., running on) the machine 122. In some embodiments, the framework agent 132 may have made such API calls within a predetermined amount of time after the framework agent 132 is installed on the machine 122. The framework agent 132 may have stored the information related to the operating environment (e.g., the output from the operating system API calls). Thus, in some embodiments, the framework agent 132 may determine the operating environment by retrieving the stored information related to the operating environment of the machine 122. The framework agent 132 may then use the compiler encapsulated in the container 112 to compile the application and the library (also encapsulated in the container 112) to generate an executable file in a format corresponding to the operating environment of the machine 112 (e.g., compatible with the operating system and the hardware architecture of the machine 112). In addition, the framework agent 132 may also install a version of the runtime environment encapsulated in the container 112 on the machine 122 based on the operating environment of the machine 122.

The framework agent 134 may also deploy the container 112 on the machine 124 in a similar manner as described herein for deploying the container 112 on the machine 122. For example, the framework agent 134 may determine an operating environment of the machine 124 (which may be different from the operating environment of the machine 122), and may use the compiler encapsulated in the container 112 to compile the source code of the application encapsulated in the container 112 to generate an executable file in a format corresponding to the operating environment of the machine 124. In addition, the framework agent 134 may also install a version of the runtime environment encapsulated in the container 112 on the machine 124 based on the operating environment of the machine 124. Since the operating environments in the machines 122 and 124 may be different (e.g., different operating systems, different versions of operating systems, different hardware architecture, etc.), the executable files generated by the framework agents 132 and 134 for the machines 122 and 124 may be different, and the versions of the runtime environment installed on the machines 122 and 124 may be different. However, the container mechanism enables the container orchestration server 102 and the framework agents to deploy the container 112 on the different machines (e.g., the machines 122 and 124) having different operating environments based on the data encapsulated in the container 112 and without requiring any modifications to the container 112.

Once the container is deployed on the one or more machines, the process 400 executes (at step 430) the application to perform the function based on the locally stored set of data and stores (at step 435) output data from executing the application on the one or more machines. For example, the orchestration manager 204 may instruct the framework agents 132 and 134 to execute the respective application instances installed on the machines 122 and 124 to process the service request.

As discussed herein, each of the machines 122 and 124 may store a corresponding subset of the data required by the service request. For example, if the service request includes a request for evaluating a machine learning model by running the machine learning model against transactions conducted in a particular period of time, the set of data required by the service request may include all of the transaction records associated with the transactions conducted during the particular period of time. A portion of the transaction records may be stored on the machine 122 while another portion (e.g., the remaining portion) of the transaction records may be stored on the machine 124. Thus, in some embodiments, based on the service request received from the user device 150, the orchestration manager 204 may instruct the framework agents 132 and 134 to iteratively make a function call to the respective application instances such that the application instances would execute one or more functions on each of the transaction records stored on the respective machines. In one example, the orchestration manager 204 may instruct the framework agent 132 to launch the application instance (that was installed on the machine 122 during the deployment of the container 112 on the machine 122) on the machine 122 (e.g., through an API call with the operating system running on the machine 122). The orchestration manager 204 may also instruct the framework agent 132 to make a function call (e.g., through an API call with the operating system running on the machine 122) based on a first transaction record stored on the machine 122. In some embodiments, the framework agent 132 may retrieve the first transaction record stored on the machine 122, may extract transaction data from the first transaction record, and may make the function call with the application instance by using the extracted transaction data as parameter(s) of the function call.

Once the application instance on the machine 122 completes executing the function corresponding to the function call based on the extracted transaction data, the application instance may produce output data as a result of executing the function based on the transaction data. For example, the machine learning model application corresponding to the container 112 may be configured to assess a risk of a transaction by producing a risk score. Thus, by using the transaction data extracted from the first transaction record as the parameter(s) for making the function call, the application instance may produce a risk score representing a risk of the transaction associated with the first transaction record. The framework agent 132 may store the output data produced by the application instance locally on the machine 122.

The framework agent 132 may then retrieve a second transaction record stored on the machine 122, may extract transaction data from the second transaction record, and may make the function call with the application instance by using the extracted transaction data as parameter(s) of the function call. When the framework agent 132 obtains output data from the application instance, the framework agent 132 may similarly store the output data locally on the machine 122. The framework agent 132 may continue to make function calls with the application instance based on the records stored on the machine 122 and to store the output data on the machine 122. In some embodiments, the orchestration manager 204 and/or the framework agent 132 may generate a script (e.g., a PERL script) for automating this iterative process until all of the transaction records stored on the machine 122 is processed by the application instance.

The orchestration manager 204 and/or the framework agent 134 may use the application instance installed on the machine 124 to process the transaction records (e.g., the portion of the data required by the service request) in a similar manner as described herein with respect to processing the transaction records on the machine 122, and store the output data from executing the application instance based on the transaction records locally on the machine 124. In some embodiments, after processing the respective subset of the data stored on the machines 122 and 124, the framework agents 132 and 134 may transmit the compiled output data to the container orchestration server 102. The orchestration manager 204 may then compile the output data received from the different framework agents (e.g., the framework agents 132 and 134) and generate a report, and may present the report to the user 140 via a user interface presented on the user device 150. In some embodiments, the orchestration manager 204 may perform additional analyses of the compiled output data before presenting the result of the analyses on the user device 150. For example, the analyses may include evaluating the performance of the machine learning model.

In some embodiments, instead of performing the analyses of the output data at the container orchestration server 102, the orchestration manager 204 may instruct the framework agents 132 and 134 to perform the one or more analyses (as required by the service request) locally on the output data stored locally on the machines 122 and 124, and to only transmit the results of the analyses to the container orchestration server 102. For example, the service request may include a request to evaluate the performance of the machine learning model. Thus, the orchestration manager 204 may instruct the framework agents 132 and 134 to evaluate the output data (e.g., assess the accuracy of the risk scores outputted by the application instances) based on the set of data (e.g., the transaction records) stored on the respective machines 122 and 124, and transmit only the evaluation results (e.g., an error rate, an accuracy score, etc.) to the orchestration server 102. Upon receiving the respective evaluation results from the machines 122 and 124, the orchestration manager 204 may combine the results (e.g., add the results together, generating a new result based on the received results, etc.) and present the combined result on the user device 150. By using the machines 122 and 124 to perform the analyses, the performance of processing the service request can be further improved as the work of performing the analyses is distributed across multiple machines, and less data is required to be transmitted between the container orchestration server 102 and the machines.

After processing the service request, the process 400 removes (at step 440) the container from the one or more machines. In some embodiments, since the container 122 was deployed on the machines 122 and 124 for processing the service request based on a particular set of data, the application corresponding to the container 122 installed on the machines 122 and 124 may no longer be needed after the service request is processed. Thus, in order to clear storage space and to avoid having unneeded applications installed on the machines 122 and 124, the orchestration manager 204 may instruct the framework agents 132 and 134 to remove the application from the machines 122 and 124. For example, each of the framework agents 132 and 134 may uninstall the application instance and the runtime environment from the respective machine (e.g., via API call with the operating system running on the machine), and may delete all of the files associated with the container 122 (e.g., the source code of the application, the compiler, the software development kit, etc.), such that the machines 122 and 124 are returned to the same state prior to the deployment of the container 122.

Figure 5:
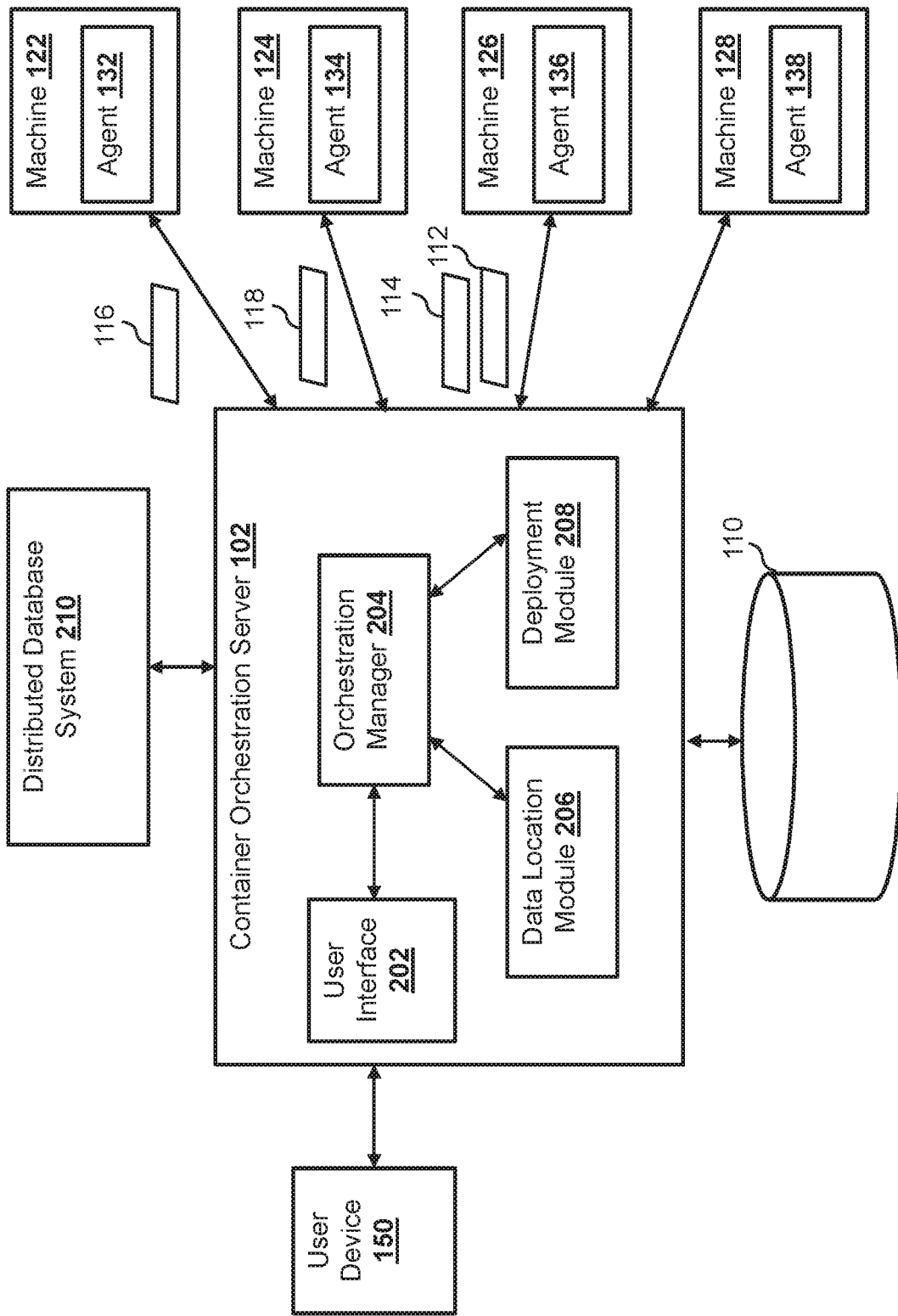
FIG. 5 is a block diagram illustrating another example of deploying containers by the container orchestration framework according to an embodiment of the present disclosure.

In the example illustrated above, only one container was deployed on the machines 122 and 124 based on the service request. However, in some embodiments, more than one container (e.g., more than one application) may be required for processing the service request. Thus, when the orchestration manager 204 determines multiple containers (e.g., at the step 415) for processing the service request, the orchestration manager 204 may transmit the multiple containers to the framework agents and may instruct the framework agents to deploy the multiple containers on the machines. For example, if the service request received from the user device 150 includes a request for running a simulation of processing the transaction requests recorded over a particular period of time (e.g., for the year 2015, etc.), the orchestration manager 204 may determine a container (e.g., the container 114) that encapsulates a web server application for processing web transaction requests and another container (e.g., the container 112) that encapsulates a machine learning model application for evaluating a risk of the web transaction requests. The data location module 206 may determine that the set of data required by the service request (e.g., the transaction records associated with transactions conducted in the year 2015) is stored on the machine 126. Accordingly, as shown in FIG. 5, the deployment module 208 may transmit the containers 112 and 114 to the machine 126, and may instruct the framework agent 136 to deploy the containers 112 and 114 on the machine 126. For example, based on the instructions from the deployment module 208, the framework agent 136 may determine the operating environment associated with the machine 126, and may use the compiler encapsulated in the container 112 to compile the source code of the application encapsulated in the container 112 to generate an executable file in a format corresponding to (e.g., compatible with) the operating environment of the machine 126. In addition, the framework agent 136 may also install a version of the runtime environment encapsulated in the container 112 on the machine 126 based on the operating environment of the machine 126.

The framework agent 136 may also deploy the container 114 on the machine 126 in a similar manner. For example, the framework agent 136 may use the compiler encapsulated in the container 114 to compile the source code of the application encapsulated in the container 114 to generate an executable file in a format corresponding to (e.g., compatible with) the operating environment of the machine 126. In addition, the framework agent 136 may also install a version of the runtime environment encapsulated in the container 114 on the machine 126 based on the operating environment of the machine 126. In some embodiments, the web server application encapsulated in the container 114 and the machine learning model application encapsulated in the container 112 may have different dependencies and/or may require a different runtime environment (or a different version of runtime environment). For example, the web server application and the machine learning model application may have been developed under different software development environments, and may require different dependencies (e.g., different libraries used by the applications) and/or different runtime environments (or different versions of runtime environments). In one example, the web server application may use a JAVA® SE 7 runtime environment and the machine learning model application may use a JAVA® SE 10 runtime environment. However, since all of the dependencies and the runtime environments are encapsulated in the respective containers, the dependencies and the runtime environments required by each application are installed on the machine 126 during the deployment process to enable both applications to run successfully on the same machine 126.

The framework agent 136 may be instructed to use both applications to simulate the processing of the web transaction requests. For example, the framework agent 136 may first feed the transaction data of each transaction record stored on the machine 126 to the web server application for the initial processing. The framework agent 136 may obtain output data from the web server application, and may feed the output data from the web server application (and possibly additional data stored on the machine 126, such as account data of a user account associated with the transaction) to the machine learning model application. Alternatively, the web server application may directly provide the machine learning model application with the processed transaction data to evaluate a risk of the transaction request. The framework agent 136 may then store the output data from the machine learning model application and/or the web server application on the machine 126. When all of the transaction records stored on the machine 126 is processed, the framework agent 136 may send the compiled output data (or an analysis of the compiled output data) to the container orchestration server 102 for further processing by the container orchestration server 102 and/or presentation on the user device 150.

In some embodiments, the set of data required by the service request may be distributed across multiple machines, and the container orchestration server 102 may instruct the framework agents of the machines to deploy the containers 112 and 114 on those machines. Each of the framework agents may compile the output data and may transmit the compiled output data (or an analysis of the compiled output data) back to the container orchestration server 102.

In the example illustrated above, the data required by both applications reside on the same machine (e.g., the machine 126). However, in some embodiments, the data set required by one application (e.g., the transaction request records for the web server application) and the data set required by the other application (e.g., the account data of user accounts associated with the transaction requests) may reside in different machines. In one example, the orchestration manager 204 may determine that the service request requires an application corresponding to the container 116 and an application corresponding to the container 118. The data location module 206 may determine that the data needed for the application corresponding to the container 116 for processing the service request is stored on a first set of machines (including the machine 122), and that the data needed for the application corresponding to the container 118 for processing the service request is stored on a second set of machines (including the machine 124). Since the container orchestration server 102 may dynamically deploy any container on any one of the machines 122-128, the container orchestration server 102 may deploy the container 116 on the machine 122 (where the data needed by the application corresponding to the container 116 is stored) and may deploy the container 118 on the machine 124 (where the data needed by the application corresponding to the container 118 is stored), as shown in FIG. 5. The deployment module 208 may also instruct the framework agent 132 to use the application corresponding to the container 116 to process the data stored on the machine 122, and instruct the framework agent 134 to use the application corresponding to the container 118 to process the data stored on the machine 124.

In some embodiments, the architecture of the container orchestration framework (e.g., having the container orchestration server 102 communicatively coupled with the framework agents 132-138) enables communications and coordination among the different machines for processing the service request. For example, the orchestration manager 204 may determine that in order for the application corresponding to the container 118 to process the service request, the application may need output data from the application corresponding to the container 116, in addition to the data stored on the machine 124. Thus, the orchestration manger 204 may coordinate with the framework agents 132 and 134 to process the data stored on the machines 122 and 124 in a streamlined manner. For example, the orchestration manager 204 may instruct the framework agent 132 to use the application installed on the machine 122 (e.g., the application corresponding to the container 116) to process the data records stored on the machine 122. For each record that is processed by the application on the machine 122, the framework agent 132 may obtain the corresponding processed data (output by the application on the machine 122) and may send the processed data to the framework agent 134. The orchestration manager 204 may also instruct the framework agent 134 to wait (e.g., idle) for the processed data from the framework agent 132. Upon receiving the processed data corresponding to a data record, the framework agent 134 may use the application on the machine 124 (e.g., the application corresponding to the container 118) to further process the processed data based on the data stored on the machine 124. The framework agent 134 may also obtain output data from the application on the machine 124. Depending on the service request and the application configurations, the framework agent 134 may either send the output data back to the framework agent 132 for further processing by the application on the machine 122 (and the framework agent 132 will send the final output data to the container orchestration server 102), or directly send the output data from the application on the machine 124 to the container orchestration server 102.

Similar to the examples illustrated above, upon receiving the output data from either the framework agent 132 or the framework agent 134, the orchestration manager 204 may generate a report based on the output data and present the report on the user device 150. The orchestration manager 204 may also instruct the framework agents 132 and 134 to uninstall the applications and remove the containers 116 and 118 and all related files from the machines 122 and 124.

Figure 6:
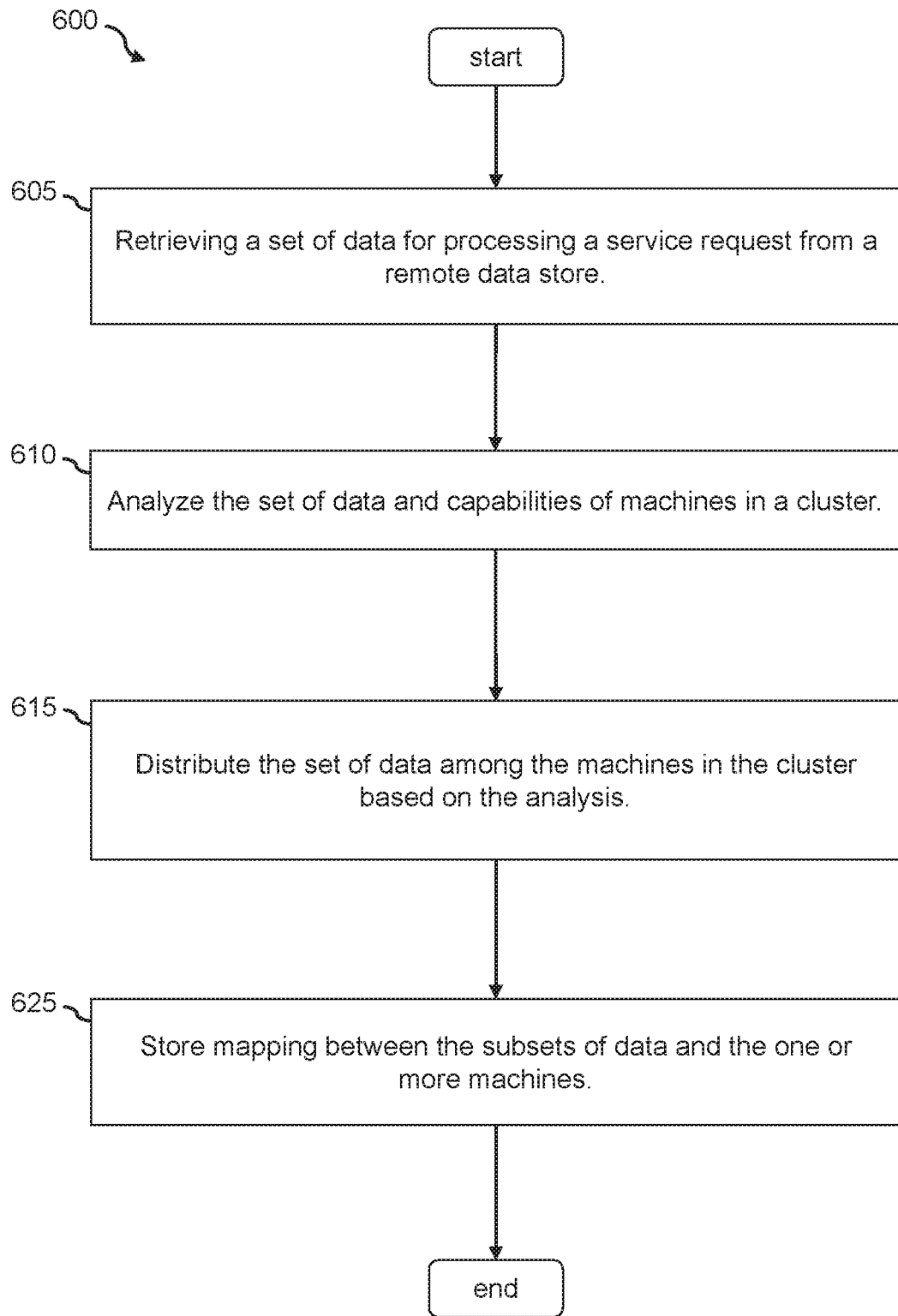
FIG. 6 is a flowchart showing a process of distributing data required by the service request across one or more machines according to an embodiment of the present disclosure.

In all of the examples illustrated above, it is assumed that the data required for processing the service request is already stored on one or more of the machines 122-128. However, in some embodiments, the data required for processing the service request may be initially stored on a remote device, such as an external device (e.g., a third-party device external to the enterprise system 100) or on a device that is not available for the container orchestration framework to deploy containers (e.g., the container orchestration framework on has read only on the device, etc.). Accordingly, the orchestration manager 204 may move (e.g., copy) the data required for processing the service request from the device(s) to one or more of the machines 122-128 where the deployment module 208 can deploy the containers. FIG. 6 illustrates a process 600 for storing data required by a service request in a cluster of machines. In some embodiments, the process 600 may be performed by the container orchestration server 102, and may be performed as part of the step 410 of the process 400. The process 600 begins by retrieving (at step 605) a set of data for performing a service request from a remote data store. For example, based on the service request received from the user device 150, the data location module 206 may determine that the data required by the service request is stored on a remote device (e.g., an external device, a device on which the container orchestration server 102 has no access to deploy containers, etc.).

The process 600 then analyzes (at step 610) the set of data and capabilities of machines in a cluster. For example, the orchestration manager 204 may analyze the set of data stored on the remote device, such as a data type, a size, etc. The orchestration manager 204 may also obtain information related to the machines 122-128, for example, from the framework agents 132-138. The information may indicate characteristics of the machines, such as performance speed (e.g., a number of processors, a speed of the processors, etc.), a storage capacity (e.g., an amount of available space for data storage, etc.), and/or a workload (e.g., a number of applications currently running on the machines, etc.).

The process 600 then distributes (at step 615) the set of data among the machines in the cluster based on the analysis. For example, based on the analysis of the set of data and the characteristics of the machines 122-128, the orchestration manager 204 may determine one or more machines for storing the set of data. In some embodiments, the one or more machines may be selected from the machines in the cluster based on criteria such as whether the available storage space on the machine exceeds a threshold capacity (where the threshold capacity may be determined based on the size of the set of data required by the service request), whether the workload of the machine is below a threshold workload, whether the speed of the machine exceeds a threshold speed, etc.

If the orchestration manager 204 determines a single machine for storing the set of data, the orchestration manager 204 may transmit the set of data from the remote device to the machine (e.g., the machine 122). On the other hand, if the orchestration manager 204 determines multiple machines for storing the set of data, the orchestration manager 204 may divide the set of data into multiple subsets of data and assign each subset of data to each of the machines. The subset of data that is assigned to each machine may depend on criteria such as the available data storage space of the machine, the workload of the machine, the speed of the machine, etc. The orchestration manager 204 may then transmit each subset of data to the corresponding machine.

The process 600 then stores (at step 625) a mapping between the subsets of data and the one or more machines selected to store the subsets of data. For example, the orchestration manager 204 may generate a mapping that maps each subset of data to a corresponding machine that stores the subset of data, and may store the mapping on the container orchestration server 102. The mapping may then be used by the deployment module 208 for deploying container(s) to the machine(s).

Figure 7:
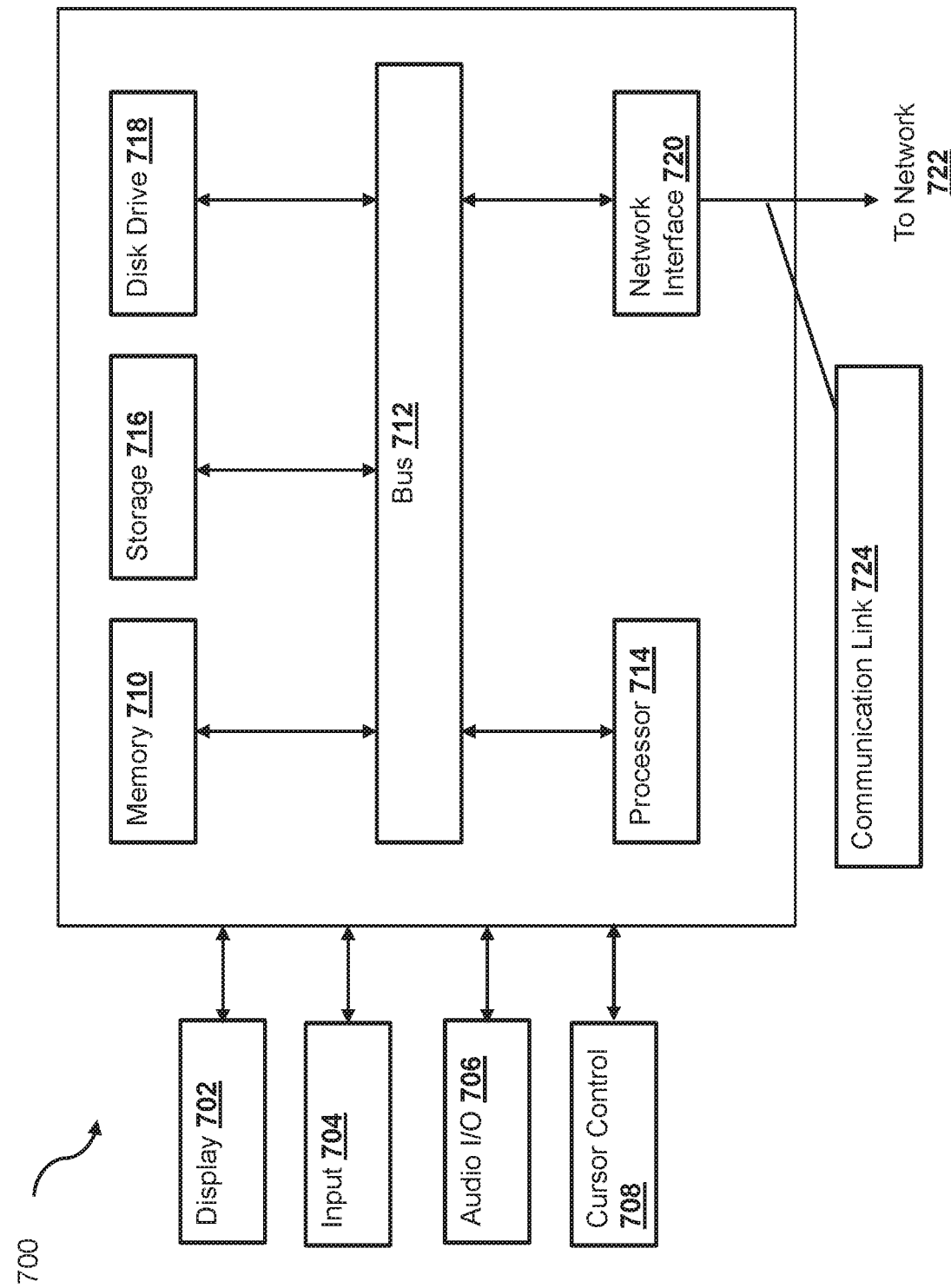
FIG. 7 is a block diagram of a system for implementing a device according to an embodiment of the present disclosure.

FIG. 7 is a block diagram of a computer system 700 suitable for implementing one or more embodiments of the present disclosure, including the container orchestration server 102, the user device 150, and the machines 122-128. In various implementations, the user device 110 may include a mobile cellular phone, personal computer (PC), laptop, wearable computing device, etc. adapted for wireless communication, and each of the container orchestration server 102 and the machines 122-128 may include a network computing device, such as a server. Thus, it should be appreciated that the devices 102, 122-128, and 150 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the container deployment functionalities described herein according to the processes 400 and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving a request for a computer service from a user device;
determining that the computer service comprises a plurality of tasks, wherein a first task of the plurality of tasks is associated with processing a first set of data by a first application, and wherein a second task of the plurality of tasks is associated with processing a second set of data by a second application;
determining that the first set of data is distributed across a first set of computer devices and that the second set of data is distributed across a second set of computer devices;
in response to determining that the first set of data is distributed across the first set of computer devices and that the second set of data is distributed across the second set of computer devices, deploying instances of the first application to the first set of computer devices and deploying instances of the second application to the second set of computer devices, wherein a respective instance of the first application is deployed on a corresponding one of the first set of computer devices, and wherein a respective instance of the second application is deployed on a corresponding one of the second set of computer devices;
configuring the instances of the first application deployed on the first set of computer devices to perform the first task of the computer service, wherein the instances of the first application are configured to process corresponding portions of the first set of data stored on the first set of computer devices and to generate corresponding intermediate data based on the processing the corresponding portions of the first set of data;
configuring the instances of the second application deployed on the second set of computer devices to perform the second task of the computer service, wherein the instances of the second application are configured to suspend processing the second set of data before receiving an indication that the corresponding intermediate data generated by each of the instances of the first application is ready;
receiving the indication that the corresponding intermediate data generated by each of the instances of the first application is ready;
in response to receiving the indication, causing the instances of the second application deployed on the second set of computer devices to produce output data based on processing the corresponding intermediate data generated by the instances of the first application and corresponding portions of the second set of data stored on the second set of computer devices; and
providing a response to the request for the computer service based on the output data.

2. The system of claim 1, wherein the first set of computer devices and the second set of computer devices comprise one or more overlapping computer devices.

3. The system of claim 1, wherein the first set of computer devices is different from the second set of computer devices, and wherein the first set of computer devices is further configured to transmit the corresponding intermediate data to the second set of computer devices.

4. The system of claim 1, wherein the operations further comprise:
analyzing the output data; and
generating analytical data based on the analyzing the output data, wherein the analytical data is provided as the response to the request for the computer service.

5. The system of claim 4, wherein the output data comprises performance data associated with a machine learning model, and wherein the analyzing the output data comprises determining one or more performance metrics for the machine learning model based on the performance data.

6. The system of claim 1, wherein the operations further comprise:
determining that the first set of data is stored on a computer device;
dividing the first set of data into the corresponding portions of the first set of data; and
distributing the corresponding portions of the first set of data across the first set of computer devices.

7. The system of claim 1, wherein the operations further comprise:

determining that the first task of the computer service has been completed; and in response to determining that the first task has been completed, removing the instances of the first application from the first set of computer devices.

8. A method, comprising:

receiving a request for a computer service from a user device, wherein the computer service comprises a first task associated with a first set of data and a second task associated with a second set of data;

determining, by a computer system, that the first set of data is stored on a first set of computer devices and that the second set of data is stored on a second set of computer devices;

in response to determining that the first set of data is stored on the first set of computer devices and that the second set of data is stored on the second set of computer devices, deploying instances of the first application to the first set of computer devices and deploying instances of the second application to the second set of computer devices, wherein a respective instance of the first application is deployed on a corresponding one of the first set of computer devices, and wherein a respective instance of the second application is deployed on a corresponding one of the second set of computer devices;

accessing, by the computer system, the instances of a first application deployed on the first set of computer devices, wherein the instances of the first application are configured to perform the first task of the computer service, wherein performing the first task comprises processing corresponding portions of the first set of data stored on the first set of computer devices and generating corresponding intermediate data based on the processing the corresponding portions of the first set of data;

accessing, by the computer system, the instances of a second application deployed on the second set of computer devices, wherein the instances of the second application are configured to perform the second task of the computer service, wherein the performing the second task comprises suspending processing the second set of data before the corresponding intermediate data generated by each of the instances of the first application is ready;

detecting that the corresponding intermediate data is ready;

in response to the detecting, causing the instances of the second application deployed on the second set of computer devices to produce output data based on processing the corresponding intermediate data generated by the instances of the first application and corresponding portions of the second set of data stored on the second set of computer devices; and providing, by the computer system, a response to the request for the computer service based on the output data.

9. The method of claim 8, further comprising:

determining that the first set of data is stored on a computer device;

dividing the first set of data into the corresponding portions of the first set of data; and distributing the corresponding portions of the first set of data across the first set of computer devices.

10. The method of claim 9, further comprising:

determining that a size corresponding to the first set of data exceeds a threshold, wherein the dividing and the distributing is performed in response to the determining that the size exceeds the threshold.

11. The method of claim 8, wherein the performing the second task further comprises analyzing the output data and generating analytical data based on the analyzing the output data, and wherein the method further comprises:

receiving the analytical data from the second application; and generating the response to the request for the computer service based on the analytical data.

12. The method of claim 11, wherein the output data comprises simulation results from performing a simulation of processing a plurality of transaction requests, and wherein the analytical data comprises one or more statistical metrics associated with the simulation results.

13. The method of claim 8, further comprising:

determining that the second task of the computer service has been completed; and in response to determining that the second task has been completed, removing the instances of the second application from the second set of computer devices.

14. The method of claim 8, wherein the first set of computer devices and the second set of computer devices comprise one or more overlapping devices.

15. A non-transitory machine-readable medium having stored thereon machine-readable instructions executable to cause a machine to perform operations comprising:

in response to receiving a request for a service from a user device, determining that the service comprises a plurality of tasks, wherein a first task of the plurality of tasks is associated with processing of a first set of data by a first application, and wherein a second task of the plurality of tasks is associated with processing of a second set of data by a second application;

determining that the first set of data is stored on a first set of computer devices and that the second set of data is stored on a second set of computer devices;

in response to determining that the first set of data is stored on the first set of computer devices and that the second set of data is stored on the second set of computer devices, deploying instances of the first application to the first set of computer devices and deploying instances of the second application to the second set of computer devices, wherein a respective instance of the first application is deployed on a corresponding one of the first set of computer devices, and wherein a respective instance of the second application is deployed on a corresponding one of the second set of computer devices;

configuring the instances of the first application deployed on the first set of computer devices to perform the first task of the service, wherein the instances of the first application are configured to process corresponding portions of the first set of data stored on the first set of computer devices and to generate corresponding intermediate data based on the processing the corresponding portions of the first set of data;

configuring the instances of the second application deployed on the second set of computer devices to perform the second task of the service, wherein the instances of the second application are configured to suspend processing the second set of data before receiving an indication that the corresponding intermediate data generated by each of the instances of the first application is ready;

receiving the indication that the corresponding intermediate data is ready;

in response to receiving the indication, causing the instances of the second application deployed on the second set of computer devices to produce output data based on processing the corresponding intermediate data generated by the instances of the first application and corresponding portions of the second set of data stored on the second set of computer devices; and transmitting, to the user device, a response to the request for the service based on the output data.

16. The non-transitory machine-readable medium of claim 15, wherein the first set of computer devices and the second set of computer devices comprise one or more overlapping computer devices.

17. The non-transitory machine-readable medium of claim 15, wherein the first set of computer devices is different from the second set of computer devices, and wherein the first set of computer devices is further configured to transmit the corresponding intermediate data to the second set of computer devices.

18. The non-transitory machine-readable medium of claim 15, wherein the operations further comprise:

analyzing the output data; and generating analytical data based on the analyzing the output data, wherein the analytical data is transmitted to the user device as the response to the request for the service.

19. The non-transitory machine-readable medium of claim 15, wherein the operations further comprise:

determining that the first set of data is stored on a computer device;

dividing the first set of data into the corresponding portions of the first set of data; and distributing the corresponding portions of the first set of data across the first set of computer devices.

20. The non-transitory machine-readable medium of claim 15, wherein the operations further comprise:

determining that the first task of the service has been completed; and in response to determining that the first task has been completed, removing the instances of the first application from the first set of computer devices.

* * * * *